United States Patent [19]

Kitano

[11] Patent Number: 5,738,504
[45] Date of Patent: Apr. 14, 1998

[54] ROTATION PREVENTING DEVICE FOR ORBITING MEMBER OF FLUID DISPLACEMENT APPARATUS

[75] Inventor: Norio Kitano, Fujioka, Japan

[73] Assignee: Sanden Corporation, Gunma, Japan

[21] Appl. No.: 692,433

[22] Filed: Aug. 5, 1996

[30] Foreign Application Priority Data

Aug. 3, 1995 [JP] Japan ................. 7-216563

[51] Int. Cl.⁶ .................. F01C 1/04; F16D 3/04
[52] U.S. Cl. ...................... 418/55.3; 464/103
[58] Field of Search ............ 418/55.3; 464/102, 464/103

[56] References Cited

U.S. PATENT DOCUMENTS

| | | | |
|---|---|---|---|
| 4,259,043 | 3/1981 | Hidden et al. | 418/55.3 |
| 4,406,600 | 9/1983 | Terauchi et al. | 418/55.3 |
| 4,457,674 | 7/1984 | Kawano et al. | 418/55.2 |
| 4,457,676 | 7/1984 | Hiraga | 418/55.5 |
| 4,468,181 | 8/1984 | Sakamoto | 418/55.3 |
| 4,472,120 | 9/1984 | McCullough | 418/55.3 |
| 4,474,543 | 10/1984 | Hiraga et al. | 418/55.3 |
| 4,492,543 | 1/1985 | Iimori et al. | 418/55.3 |
| 4,527,963 | 7/1985 | Terauchi | 418/55.3 |
| 4,545,746 | 10/1985 | Sugimoto et al. | 418/55.3 |
| 4,589,828 | 5/1986 | Sato et al. | 418/55.3 |
| 4,626,179 | 12/1986 | Terauchi | 418/55.2 |
| 4,645,435 | 2/1987 | Sugimoto | 418/55.3 |
| 4,934,909 | 6/1990 | Suzuki et al. | 418/55.3 |
| 5,102,315 | 4/1992 | Terauchi et al. | 418/55.3 |
| 5,221,198 | 6/1993 | Izumi et al. | 418/55.3 |
| 5,423,663 | 6/1995 | Fukui | 418/55.3 |
| 5,435,706 | 7/1995 | Matsumoto et al. | 418/55.3 |

FOREIGN PATENT DOCUMENTS

| | | |
|---|---|---|
| 0049881 | 4/1982 | European Pat. Off. . |
| 0123407 | 10/1984 | European Pat. Off. . |
| 2455196 | 11/1980 | France . |
| 63-179185 | 7/1988 | Japan ................. 418/55.3 |
| 63-266214 | 11/1988 | Japan . |
| 05033811 | 2/1993 | Japan . |
| 05126140 | 5/1993 | Japan . |
| 07019249 | 1/1995 | Japan . |

*Primary Examiner*—John J. Vrablik
*Attorney, Agent, or Firm*—Baker & Botts, L.L.P.

[57] ABSTRACT

A thrust bearing and coupling component includes a fixed ring fastened to an inner surface of the housing and an orbiting ring fastened to an axial end surface of the end plate of the orbiting member facing the fixed ring. The fixed and orbiting rings have a plurality of corresponding circular pockets, each pocket on the fixed ring faces a pocket on the orbiting ring corresponding in size, pitch, and radial distance. A ball bearing is placed within each facing pair of corresponding pockets. The corresponding pockets interact with the ball bearings to prevent rotation of the orbiting member during orbital motion. The circular pockets include rounded corners formed at the open end thereof which interact non-abrasively with the ball bears. Thus, the rotation preventing and thrust bearing device may be easily constructed and manufactured, and its components may exhibit a longer life.

14 Claims, 4 Drawing Sheets

ROTATION PREVENTING DEVICE FOR ORBITING MEMBER OF FLUID DISPLACEMENT APPARATUS

BACKGROUND OF THE INVENTION

1. Field of the Invention

The invention relates to a fluid displacement apparatus, and more particularly, to an improvement in a rotation preventing and thrust bearing device for an orbiting member of fluid displacement apparatus.

2. Description of Related Art

Scroll-type fluid displacement apparatus are known in the art. For example, U.S. Pat. No. 4,892,469, which is incorporated herein by reference, describes an apparatus including two scroll members each having an end plate and a spiral or involute spiral element. The scroll members are maintained at an angular and a radial offset, so that both spiral elements interfit to create a plurality of line contacts between the spiral curved surfaces, to thereby seal off and define at least one pair of fluid pockets. The relative orbital motion of these scroll members shifts the line contacts along the spiral curved surfaces and thereby changes the volume in the fluid pockets. The volume of the fluid pockets increases or decreases depending on the direction of orbital motion. Thus, a scroll-type fluid displacement apparatus is capable of compressing, expanding, or pumping fluids.

Generally, in scroll-type fluid displacement apparatus, one scroll may be fixed to a housing, and the other scroll, which is the orbiting scroll, may be eccentrically supported on a crank pin of a rotation shaft to cause orbital motion. Scroll-type fluid displacement apparatus also may include a rotation preventing device which prevents rotation of the orbiting scroll in order to maintain the scrolls in a predetermined angular relationship during operation of the apparatus.

Because the orbiting scroll in such scroll-type fluid displacement apparatus is supported on a crank pin in a cantilever manner, an axial shift of this orbiting scroll occurs. An axial slant also occurs because the movement of the orbiting scroll is not a rotary motion around the center of the orbiting scroll, but instead is an orbiting motion caused by the eccentric movement of a crank pin driven by the rotation of the drive shaft. Several problems may result from this axial slant including improper sealing of line contacts, vibration of the apparatus during operation, and noise caused by the spiral elements striking each other. A solution to these problems is the use of a thrust bearing device for carrying the axial loads. Thus, a scroll-type fluid displacement apparatus may be provided with a rotation preventing including thrust bearing device within the housing. Such a rotation preventing and thrust bearing device has an orbital portion, a fixed portion, and a plurality of bearings, such as balls or spheres. The orbital portion includes a first annular race and ring, both of which are formed separately. The first race is placed within an annular groove formed on an axial end surface of the end plate of the orbiting member. The first ring is fitted against the axial surface of the end surface of the first race. The fixed portion has a second annular race and a second ring, both of which are formed separately. The second race is placed within an annular groove formed on an axial end surface of the housing, and the second ring covers the axial end surface of the second race. A clearance is maintained between the first ring of the orbital portion and the second ring of the fixed portion.

The orbital and fixed rings each have a plurality of holes arranged axially, the number of holes in each ring being equal. Each bearing is permitted to roll with respect to the orbital race and also is permitted to roll with respect to the fixed race. The bearings roll along the edges of both facing pockets.

As a result, the rotation of the orbiting member is prevented by the bearings, and the thrust load from the orbiting member is supported at the fixed race through the bearings. However, the bearing balls in the pockets of rings interact with the edges of these pockets to prevent rotation of the orbiting scroll. The abrasion of these bearings increases because the edges of pockets contact the bearings.

Examples of such scroll-type fluid displacement apparatus are described in Japanese Publication Nos. H5-33811 and H5-587131, which are incorporated herein by reference. In these apparatus, a rotation preventing and thrust bearing device is located between the inner end surface of front end plate and the axial end surface of end plate of the orbiting scroll. Such rotation preventing and thrust bearing devices have fixed indentations formed on the inner end surface of from end plate, a plurality of orbiting indentations formed on the axial end surface of the orbiting scroll and a plurality of bearing elements, such as balls or spheres. Each bearing element is placed in facing, generally aligned indentations. Rotation of the orbiting scroll is prevented by the interaction between bearings and indentations; also, the axial thrust load from the orbiting scroll is supported by the front end plate. Fixed and orbiting cover plates, which are made from discrete parts of the front end plate and of the orbiting scroll and are formed by a press working, are disposed on the inner end surface of the from end plate and the end surface of the orbiting scroll to prevent wear of the indentations. Further, fixed and orbiting cover plates include a pair of grooved portions in cross-section. Each grooved portion has the bottom formed as a circle track and an arc-shaped wall with a diameter greater than that of the bearing. The circle track has a diameter substantially equal to the orbiting radius of the orbiting scroll. In this configuration, the bearing travels in a regular manner along the circle track within the groove. However, pairs of arc-shaped grooves are complex in shape. Therefore, the machining and fabrication of these plates is difficult and intricate and results in increased costs of manufacturing.

Further, scroll-type compressors may be provided with a swing-link mechanism which prevents the compressor from "slugging." Slugging is detrimental to the internal components of scroll-type air conditioning compressors. Slugging occurs when fluid refrigerant used in the air conditioning system condenses into liquid. This may occur when an automobile is subjected to cold temperatures during the winter months or to large temperature deviations, such as in the day/night cycle in desert areas. The refrigerant in the gaseous state tends to migrate into the lower temperature areas of the internal components of the compressor. Specifically, the refrigerant in a gaseous state condenses in the cavities formed within the two interfitting scrolls. Operation with the refrigerant in a condensed or liquid state is detrimental to the internal components of the air conditioning compressor because the compressor is generally designed to compress only fluid in gaseous form, not fluid in liquid form. Attempts to compress liquid refrigerant may stress compressor components or deform compressor components entirely. In particular, the swing-link mechanism includes a bushing capable of swinging around a crank pin. Thus, the swing-link mechanism allows an orbiting scroll to reduce its orbital radius and to separate the line contacts between a fixed scroll and the orbiting scroll to prevent "slugging." However, the configuration described above may prevent the swing-like mechanism from properly operating because the bearing only travels on the circle track having one radius of orbital motion.

SUMMARY OF THE INVENTION

It is an object of the present invention to provide a fluid displacement apparatus having rotation preventing and thrust bearing device which may be easily constructed and manufactured.

It is another object of the present invention to provide a fluid displacement apparatus having a rotation preventing and thrust bearing device, the components of which have an increased operational life.

It is yet another object of the present invention to provide a fluid displacement apparatus having a rotation preventing and thrust bearing device which does not interfere with the operation of a swing-link mechanism.

According to present invention, a thrust bearing and coupling component for simultaneously coupling an orbiting scroll member having a predetermined orbit radius and a fixed scroll member in a predetermined angular relationship to the orbiting scroll member may be orbited with respect to the fixed scroll member and may support axial loads imposed on the scroll members. Such thrust bearing and coupling component may include a fixed ring fastened to an inner surface of the housing and an orbiting ring fastened to an axial end surface of the end plate of the orbiting member and facing the fixed ring. Each of the fixed and orbiting rings may have a plurality of corresponding pockets, e.g., circular pockets, each pocket on the fixed ring facing a pocket on the orbiting ring corresponding in size, pitch, and radial distance. A bearing element, such as a ball bearing, is placed within each facing pair of the corresponding pockets. The corresponding pockets include a predetermined number of rotation preventing pockets on each of the fixed and orbiting rings for interacting with the bearing elements to prevent rotation of the orbiting member during orbital motion. The pockets include a rounded edge portion formed at the open end thereof, which interacts non-abrasively with the bearing element.

The pockets may be formed by a press working and may include an inner surface which interacts with the bearing element at surface contacts.

Further objects, features, and advantages of this invention will be understood from the following detailed description of preferred embodiments with reference to the attached drawings.

DETAILED DESCRIPTION OF PREFERRED EMBODIMENTS

Figure 1:
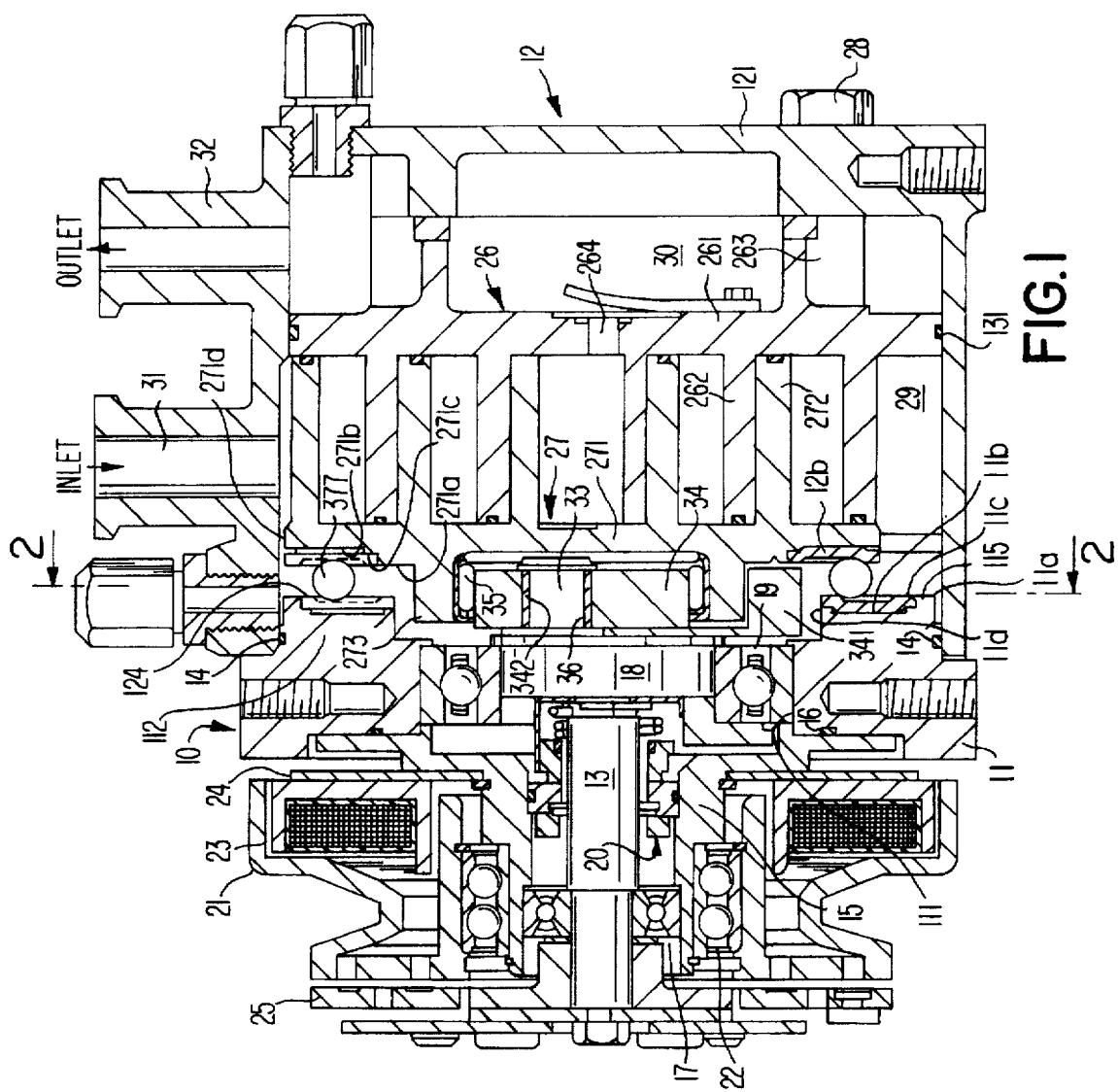
FIG. 1 is a cross-sectional view of a scroll-type refrigerant compressor in accordance with an embodiment of the present invention.
Figure 2:
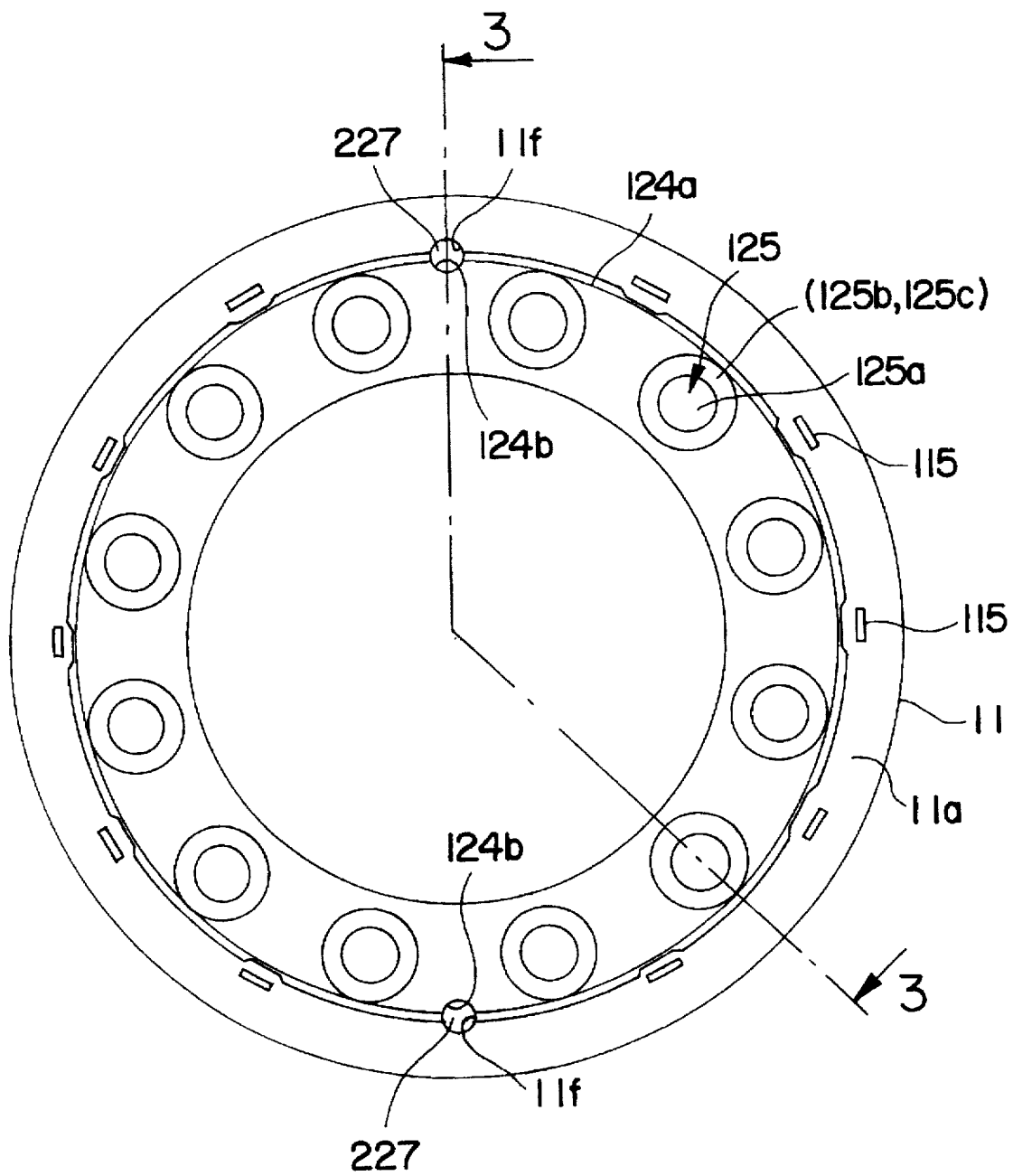
FIG. 2 is a front view of an annular fixed race of the rotation prevention device and thrust bearing device taken along line 2—2 of FIG. 1.

Referring to FIG. 1, a fluid displacement apparatus in accordance with the present invention is shown in the form of a scroll-type refrigerant compressor unit 100. Compressor unit 100 includes compressor housing 10 having a front end plate 11, and a cup-shaped casing 12 is attached to an end surface of front end plate 11.

Figure 3:
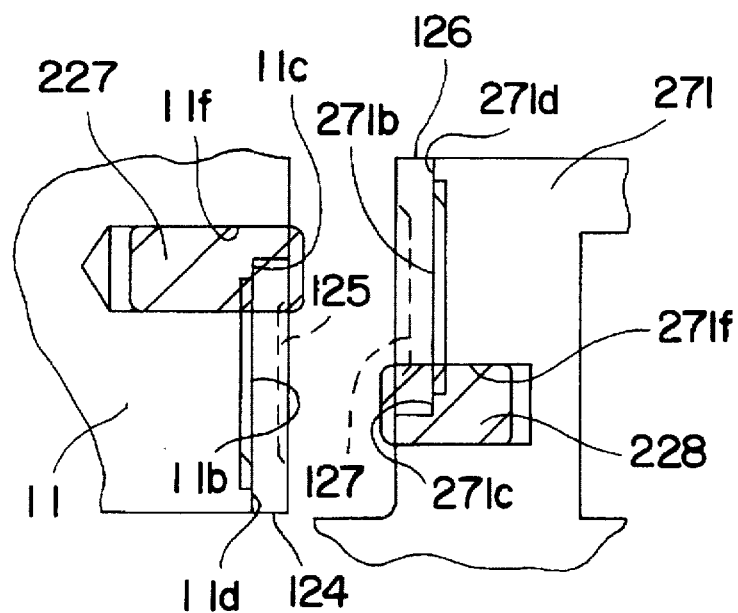
FIG. 3 is an enlarged partial, cross-sectional view of a fixed race and orbital race secured to a front housing end and an orbiting scroll taken along line 3—3 of FIG. 2.
Figure 4:
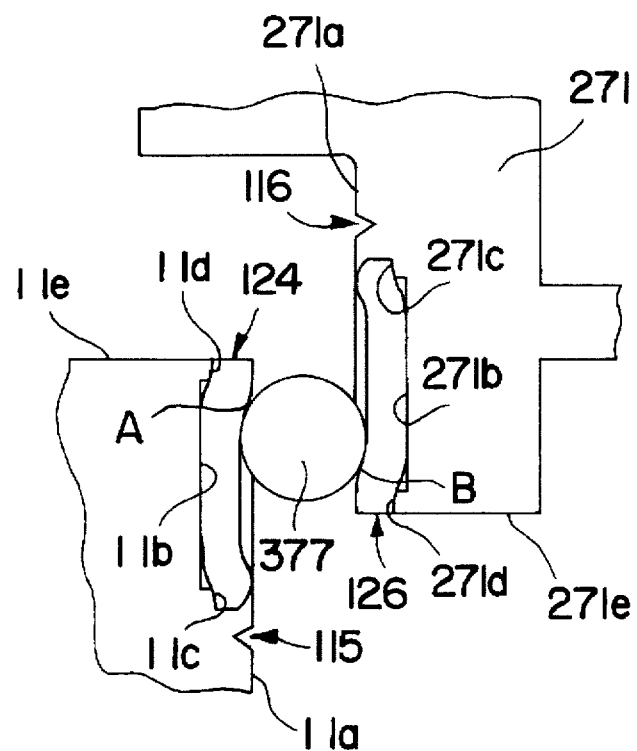
FIG. 4 is an enlarged partial, cross-sectional view of a rotation prevention and thrust bearing device in accordance with a first embodiment of the present invention.

An opening 111 is formed in the center of the front end plate 11 to permit passage of a drive shaft 13. An annular projection 112 is formed in the rear end surface of front end plate 11, which faces cup-shaped casing 12; thus, annular projection 112 is concentric with opening 111. An outer peripheral surface of annular projection 112 engages an inner wall of the opening of cup-shaped casing 12. Cup-shaped casing 12 is fixed on the rear end surface of front end plate 11 by a fastening device, for example, bolts and nuts, so that the opening of cup-shaped casing 12 is covered by front end plate 11. An O-ring 14 is placed between the outer peripheral surface of annular projection 112 and the inner wall of the opening of cup-shaped casing 12 to seal the mating surface of front end plate 11 and cup-shaped casing 12. Front end plate 11 has an annular sleeve 15 projecting from the front end surface thereof which surrounds drive shaft 13 and defines a shaft seal cavity. In the embodiment shown in FIG. 3, sleeve 15 is separated from front end of end plate 11 shown in FIG. 1, sleeve 15 is fixed to the front end surface of front end plate 11 by screws (not shown). An O-ring 16 is placed between the end surface of front end plate 11 and an end surface of sleeve 15 to seal the surface of front end plate 11 and sleeve 15. Alternatively, sleeve 15 may be integral with front end plate 11.

Drive shaft 13 is rotatably supported by sleeve 15 through a bearing 17 located near the from end of sleeve 15. Drive shaft 13 has a disk 18 at its inner end which is rotatably supported by front end plate 11 through a bearing 19 located within opening 111 of front end plate 11. A shaft seal assembly 20 is coupled to drive shaft 13 within the shaft seal cavity of sleeve 15.

A pulley 21 is rotatably supported by a bearing 22 which is located on an outer surface of sleeve 15. An electromagnetic coil 23, which surrounds sleeve 15, is supported by a support plate 24 in an annular cavity of pulley 21. An armature plate 25 is elastically supported on the outer end of drive shaft 13 which extends from sleeve 15. A magnetic clutch includes pulley 21, a magnetic coil 23, and an armature plate 25. In operation, drive shaft 13 is driven by an external drive power source, for example, a vehicle engine, through a rotation force transmitting device, such as the magnetic clutch described above.

A fixed scroll 26, an orbiting scroll 27, a driving mechanism for orbiting scroll 27, and a rotation preventing and thrust bearing device for orbiting scroll 27 are located within an inner chamber of cup-shaped casing 12. The inner chamber is formed between the inner wall of cup-shaped casing 12 and front end plate 11.

Fixed scroll 26 includes circular end plate 261, a wrap or spiral element 262 affixed to or extending from one side surface of circular end plate 261, and a plurality of internally threaded bosses 263 axially projecting from the other end surface of circular plate 261. An axial end surface of each boss 263 is seated on the inner surface of an end plate 121 of cup-shaped casing 12 and fixed by bolts 28. Thus, fixed scroll 26 is fixed within cup-shaped casing 12. Circular plate 261 of fixed scroll 26 divides the inner chamber of cup-shaped casing 12 into a discharge chamber 30 and suction chamber 29. A seal ring 131 is located between the outer peripheral surface of circular plate 261 and the inner wall of cup-shaped casing 12. A hole or discharge port 264 is formed through circular plate 261 at a position near the center of spiral element 261. Discharge port 264 is connected between the central fluid pockets of the spiral element 262 and discharge chamber 30.

Orbiting scroll 27 also includes a circular end plate 271 and a wrap or spiral element 272 affixed to or extending from one side surface of circular end plate 271. Spiral element 272 of orbiting scroll 27 and spiral element 262 of fixed scroll 26 interfit at an angular offset of 180 degrees and a predetermined radial offset. At least a pair of fluid pockets are thereby defined between spiral elements 262 and 272. Orbiting scroll 27, which is connected to drive mechanism and to the rotation preventing and thrust bearing device, is driven in an orbital motion at a circular radius Ro by rotation of drive shaft 13 to compress fluid passing through compressor unit 100. Generally, radius Ro of orbital motion is given by the following formula:

Ro=[(pitch of spiral element)−2(wall thickness of spiral element)]/2

The spiral element 272 is radially offset from spiral element 262 of fixed scroll member 26 by distance Ro. Thus, orbiting scroll 27 undergoes orbital motion of a radius Ro upon rotation of drive shaft 13.

Drive shaft 13, which is rotatably supported by sleeve 15 through bearing 17, is connected to disk 18. Disk 18 is rotatably supported by front end plate 11 through bearing 19 disposed within opening 111 of front end plate 11. A crank or drive pin 33 axially projects from an axial end surface of disk 18 at a position which is radially offset from the center of drive shaft 13. Circular plate 271 of orbiting scroll 27 has a tubular boss 273 axially projecting from the end surface opposite the surface from which spiral element 272 extends. A discoid or short axial bushing 34 fits into boss 273 and is ratably supported therein by a bearing, such as a needle bearing 35. Bushing 34 has a balance weight 341 which has the shape of a semi-disk or ring radially connected to bushing 34 along a front surface thereof. An eccentric hole 342 is formed in bushing 34 at a position radially offset from the center of bushing 34. Drive pin 33 fits into eccentric hole 342 together with bearing 36. Bushing 34, which is driven by the revolution of drive pin 33, rotates within bearing 35.

The rotation of orbiting scroll 27 is prevented by a rotation preventing and thrust bearing device positioned between the inner wall of the housing 10 and circular plate 271 of orbiting scroll 27 and around boss 273 of orbiting scroll 27. As a result, orbiting scroll 27 orbits while maintaining its angular orientation relative to fixed scroll 26.

Referring to FIGS. 1–4, rotation preventing and thrust bearing device is provided with an annular fixed race 124, an annular orbital race 126, and bearings, such as balls 377. Annular fixed race 124 is disposed in annular groove 11b formed on axial end surface 11a of front end plate 11. Front end plate 11 includes a first and a second shoulder portions 11c and 11d formed in the outer radial bottom side of groove 11b and concentric with each other. Orbital race 126 is disposed in an annular groove 271b formed on end surface 271a of circular end plate 271 of orbiting scroll 27. Circular end plate 271 or orbiting scroll 27 includes a first and a second shoulder portions 271c and 271d formed in the outer radial bottom side groove 271b and concentric with each other. Annular fixed race 124 and annular orbiting race 126 each have a plurality of pockets 125 and 127 in the axial direction preferably formed by a press working process. The number of pockets in each race 124 and 126 is equal. Annular fixed race 124 and annular orbiting race 126 face each other at a predetermined axial clearance. The radius of each pockets 125 of annular fixed race 124 is formed as same as that of each pocket 127 of orbital race 126. Pockets 125 correspond in location to pockets 127, i.e., at least each pair of pockets facing each other have the same pitch, and the radial distance of pockets from the center of their respective race 124 and 126 is about equal.

Figure 5:
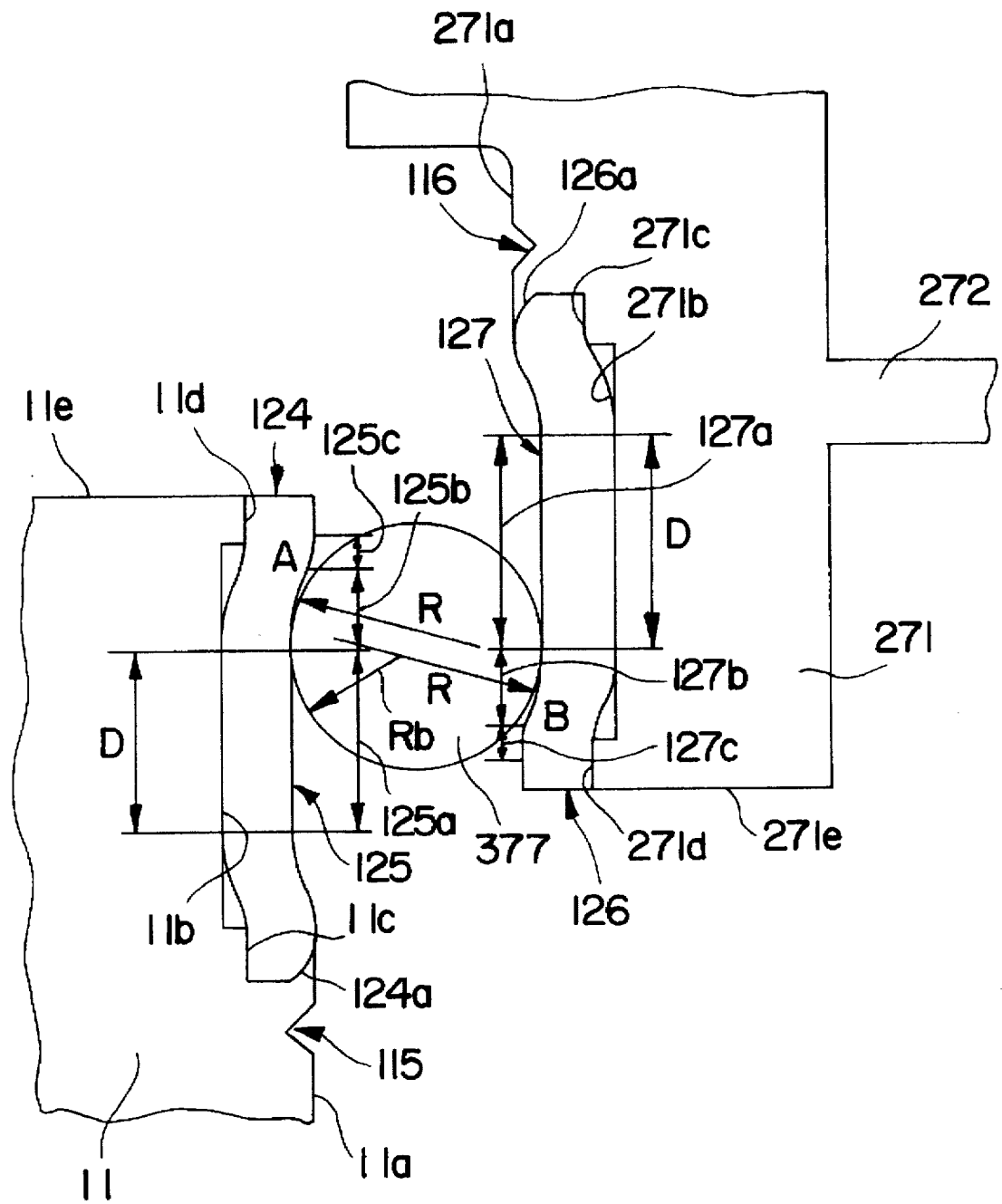
FIG. 5 is an enlarged partial, cross-sectional view of a rotation prevention and thrust bearing device in accordance with a second embodiment of the present invention.

Further, annular fixed race 124 includes a pair of notches 124b formed in a circumference thereof at an angular interval and cut surface 124a formed in the circumference by beveling an edge thereof. Front end plate 11 includes a pair of holes 11f formed thereon at the angular interval corresponding to the angular interval of notches 124b of annular fixed race 124. Annular fixed race 124 is secured on groove 11b of front end plate 11, such that a pair of notches 124b fits in locator pin 227 inserted into hole 11f of front end plate 11. Annular fixed race 124 is secured to front end plate 11, such that radial inner end of axial end surface 11a overlies cut surface 124a at trace 115 by use of caulking. Further, pockets 125 and 127 of annular fixed and orbital races 124 and 126 include bottom plane portions 125a and 127a respectively axially offset from one end surface of annular fixed and orbital races 124 and 126, first walls 125b and 127b extending from bottom plate portions 125a and 127a and second walls 125c and 127c, i.e., joining portions, radially extending from first wall 125b and 127b, respectively. Diameter D of bottom plate portions 125a and 127a is designed to be substantially equal to radius Ro which is the orbital radius of orbiting scroll 27. Further, radius of curvature R of first walls 125b and 127b is designed to be greater than radius Rb of ball 377. Referring to FIG. 5, when balls 377 contact A or B point, at which first walls 125b and 127b respectively joins to second walls 125c and 127c, any points on second wall 125c and 127c is designed to never contact with peripheral surface of ball 377. Cross-sectional points A and B and other points similar to points A and B are designed to be rounded portions (not sharp edge portions).

Thus, annular fixed and orbital races 124 and 126 are secured to front end plate 11 and orbiting scroll 27, such that the rear axial ends of annular fixed and orbital races 124 and 126 closely contact with groove 11b, first and second shoulder portions 11c and 11d, groove 271b, and first and second shoulder portions 271c and 271d. Further, peripheral end 11e of front end plate 11 is designed to extend radially inside of point A, and peripheral end 71e of end plate 271 is designed to extend radially outside of point B.

The operation of the compressor is described below. As the orbiting scroll 27 orbits, the line contacts between spiral elements 262 and 272 move toward the center of the spiral elements along the surface of the spiral elements. The fluid pockets, which are defined by spiral element 262 and 272, also move toward the center with a consequent reduction in volume and compression of the fluid in the fluid pockets. The fluid or refrigerant gas, which is introduced into suction chamber 29 from an external fluid circuit through inlet port 31, is drawn into the fluid pockets formed between spiral elements 262 and 272 from the outer ends of the spiral elements. As orbiting scroll 27 orbits, fluid in the fluid pockets is compressed, and the compressed fluid is discharged into discharge chamber 30 from the central fluid pocket of the spiral elements through hole 264. The fluid then is discharged to the external fluid circuit through an outlet port 32.

When orbiting scroll 27 is driven by rotation of drive shaft 13, the center of orbital race 126 orbits about a circle of radius Ro. However, a rotation force, i.e., moment, which is created by the offset of the acting point of the reaction force of compression and the acting point of the drive force, acts on orbiting scroll 27. This reaction force tends to rotate the orbiting scroll 27 about the center of orbiting race 126. Thus, the locus of the contact points of each balls 377 on pockets 125 and 127 are a circle having radius Ro, i.e., the traveling radius of each ball 377 with respect to the axial end surface of fixed race 124 and orbital race 126 is defined by Ro. The rotation of orbiting scroll 27 is prevented by balls 377, each of which contacts with first walls 125b and 127b during operation while the angular relationship between fixed scroll 26 and orbiting scroll 27 is maintained. Moreover, the axial load from orbiting scroll 27, which is caused by the reaction force of the compressed gas, is carried by fixed race 124, orbital race 126, and balls 377. Therefore, each of balls 377 may be supported by first walls 125b and 127b with broad surface contacts different from the line contacts of known devices because radius of curvature R of first walls 125b and 127b is respectively greater than radius Rb of balls 377.

Further, balls 377 do not contact with second walls 125c and 127c because any surface points on second walls 125c and 127c are designed to be outside of the peripheral surface of which balls 377 roll contacting with point A or B. Moreover, front end plate 11 and end plate 271 may securely support the axial ends of fixed and orbital races 124 and 126 when balls 377 roll within pockets 125 and 127 because peripheral end 11d of front end 11 is formed radially inside of point A and peripheral end 271d of end plate 271 is formed radially outside of point B relation to drive shaft 13. The abrasion of balls 377 decreases in comparison with known compressors because pockets 125 and 127 do not have abrasion accelerating sharp edge portion. As a result, this configuration increases the overall life of a rotation prevention and thrust bearing device. In addition, in compressors having swing-link mechanism, swing link mechanism allow an orbital scroll to reduce its orbital radius and ball 377 freely travels within bottom plane portion 125a and 127a when the compressor occurs "slugging". Therefore, the rotation prevention/thrust bearing device of this embodiment does not prevent the swing link mechanism from operating.

Pockets 125 and 127 are manufactured by a press working, and the shape of pockets 125 and 127 is simple in comparison to the known compressors (including a pair of cross-sectional, arc-shaped pockets). Therefore, the rotation prevention and thrust bearing permits simpler and less expensive fabrication and production.

Referring again to FIG. 5, a rotation preventing and thrust bearing device is shown according to a second embodiment of the present invention. The device depicted here is generally similar to the device described above. However, some differences exist and are evident from the drawing. In particular, each of the pockets of the fixed and orbital rings includes a curved bottom portion axially offset from one another and a first wall radially extending from the curved bottom portion and having a radius of curvature greater than a radius of the bearing element. A second wall extends radially from the first wall, so that the second wall is outside of a locus which the bearing element defines during the orbiting of the scroll member. Nevertheless, in the structures of such embodiments, substantially the same effects and advantages as those in the first embodiment may be obtained.

Although the present invention has been described in connection with preferred embodiments, the invention is not limited thereto. It will be understood by those of ordinary skill in the art that variations and modifications may be made within the scope of this invention as defined by the following claims.

I claim:

1. A thrust bearing and coupling component for simultaneously coupling an orbiting scroll member having a predetermined orbit radius and a fixed scroll member in a predetermined angular relationship with said orbiting scroll member, orbiting with respect to said fixed scroll member and supporting axial loads imposed on said scroll members, comprising;

a fixed ring fastened to an inner surface of said housing and an orbiting ring fastened to an axial end surface of said end plate of said orbiting member facing said fixed ring, each of said fixed and orbiting rings having a plurality of corresponding pockets, each pocket on said fixed ring facing a pocket on said orbiting ring correspondence in size, pitch, and radial distance;

a bearing element placed within each facing pair of said corresponding pockets, said corresponding pockets including a predetermined number of rotation preventing pockets on each of said fixed and orbiting rings for interacting with said bearing elements to prevent rotation of said orbiting member during orbital motion;

said pockets having an open end and including a rounded edge portion formed at said open end thereof to prevent abrasive interaction between said open end and said bearing element.

2. The thrust bearing and coupling component of claim 1, said pockets includes an inner surface formed to interact with said bearing element at surface contacts.

3. The thrust bearing and coupling component recited in claim 1, said pockets is formed by a press working.

4. The thrust bearing and coupling component of claim 1, wherein each of said pockets of said fixed and orbital rings includes a curved bottom portion axially offset from one another and a first wall radially extending from said curved bottom portion and having a radius of curvature greater than a radius of said bearing element and a second wall radially extending from said first wall, so that said second wall is outside of a locus which said bearing element define during orbiting of said scroll member.

5. The thrust bearing and coupling component of claim 4, wherein a joining portion joining said first wall to said second wall is rounded.

6. The thrust bearing and coupling component of claim 4, wherein a diameter of said curved bottom portion is substantially equal to or greater than orbital radius of said orbiting scroll member.

7. The thrust bearing and coupling component of claim 1, wherein said bearing element is a ball bearing.

8. A fluid displacement apparatus including;

a housing having a front end plate;

a fixed member attached to said housing, an orbiting member having an end plate from which an annular member extends, said fixed and orbiting members interfitting at a radial offset to establish at least one line contact to separate a fluid outlet from a fluid inlet;

a driving mechanism including a rotatable drive shaft connected to said orbiting member to drive said orbiting member in an orbiting motion;

a rotation preventing and thrust bearing means connected to said orbiting member for carrying axial loads from said orbiting member and preventing the rotation of said orbiting member, so that at least one line contact moves toward a compressor discharge side during orbital motion, said rotation preventing and thrust bearing means including a fixed ring fastened to an inner surface of said housing and an orbiting ring fastened to an axial end surface of said end plate of said orbiting member facing said fixed ring, said fixed and orbiting rings having a plurality of corresponding circular pockets, each pocket on said fixed ring facing a pocket on said orbiting ring corresponding in size, pitch, and radial distance;

said rotation preventing and thrust bearing means further including a plurality of bearing elements, each of which placed within a facing pair of said corresponding pockets, said corresponding pockets including a predetermined number of rotation preventing pockets on each of said fixed and orbiting rings for interacting with said bearing elements to prevent rotation of said orbiting member during orbital motion;

wherein said circular pockets include a rounded edge portion formed on an open end thereof and interacting non-abrasively with said bearing element.

9. The fluid displacement apparatus of claim 8, said circular pockets include an inner surface formed to interact with said bearing element at surface contacts.

10. The fluid displacement apparatus of claim 8, said circular pockets is formed by a press working.

11. The fluid displacement apparatus of claim 8, wherein each of said pockets of said fixed and orbital rings includes circular bottom portion axially offset from one end thereof, a first wall portion radially extending from said circular bottom portion and having a radius of curvature greater than a radius of said bearing element and said second wall radially extending from said first wall, so that said second wall outside of a locus which said bearing element define during orbiting of said scroll member.

12. The fluid displacement apparatus of claim 11, wherein a joining portion joining said first wall to said second wall is rounded.

13. The fluid displacement apparatus of claim 11, wherein a diameter of said circular bottom portion is not less than said orbital radius of said orbiting scroll member.

14. The fluid displacement apparatus of claim 1, wherein said bearing element is a ball bearing.

* * * * *